(12) United States Patent
Klovning et al.

(10) Patent No.: US 12,524,060 B2
(45) Date of Patent: Jan. 13, 2026

(54) ACTIVITY MONITORING FOR ELECTRONIC DEVICE

(71) Applicant: Elliptic Laboratories ASA, Oslo (NO)

(72) Inventors: Espen Klovning, Strømmen (NO); John Magne Helgesen Røe, Sørumsand (NO)

(73) Assignee: Elliptic Laboratories ASA, Oslo (NO)

( * ) Notice: Subject to any disclaimer, the term of this patent is extended or adjusted under 35 U.S.C. 154(b) by 86 days.

(21) Appl. No.: 18/684,444

(22) PCT Filed: Sep. 21, 2022

(86) PCT No.: PCT/EP2022/076142
§ 371 (c)(1),
(2) Date: Feb. 16, 2024

(87) PCT Pub. No.: WO2023/046705
PCT Pub. Date: Mar. 30, 2023

(65) Prior Publication Data
US 2024/0427404 A1    Dec. 26, 2024

(30) Foreign Application Priority Data
Sep. 23, 2021    (NO) ................................ 20211143

(51) Int. Cl.
*G06F 1/32*    (2019.01)
*G06F 1/3231*  (2019.01)
(Continued)

(52) U.S. Cl.
CPC .......... *G06F 1/3234* (2013.01); *G06F 1/3231* (2013.01); *G06N 3/02* (2013.01)

(58) Field of Classification Search
CPC ........ G06F 1/3234; G06F 1/3231; G06N 3/02
See application file for complete search history.

(56) References Cited

U.S. PATENT DOCUMENTS 10,951,485 B1 *  3/2021  Hermoni ............... H04L 41/069
2008/0051165 A1  2/2008  Burgan et al.
(Continued)

FOREIGN PATENT DOCUMENTS

JP      2020101560 A    7/2020
KR    1020100086141      8/2015
(Continued)

OTHER PUBLICATIONS

Patent Cooperation Treaty, International Application No. PCT/EP2022/076142, "International Search Report," Feb. 1, 2023, 2 pages.

*Primary Examiner* — Zahid Choudhury
(74) *Attorney, Agent, or Firm* — Bradley Arant Boult Cummings LLP

(57) ABSTRACT

The present invention relates to a method and an electronic device including at least two measuring units, wherein a first measuring unit is an active measuring unit emitting and receiving a signal related to a first chosen parameter in a sequence, said sequence having inactive periods, and wherein the second measuring unit comprises an essentially continuous measurement of a predetermined second parameter, the second measuring unit having a lower power consumption than the first measuring unit. The first parameter is related to a proximity measurement configured to measure the proximity of an object in the vicinity of the device and the second parameter being related to a measure of the activity of the device. The device including a processing unit coupled to said measurement units and being configured to register deviation in the second parameter and at a predetermined deviation alter the sequency of the first measurement.

15 Claims, 3 Drawing Sheets

Figure 2A:
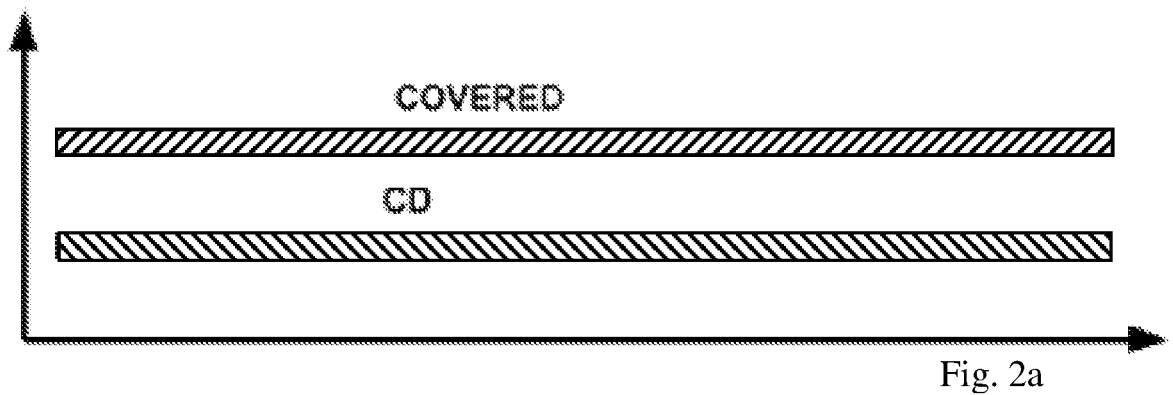

(51) Int. Cl.
*G06F 1/3234* (2019.01)
*G06N 3/02* (2006.01)

(56) References Cited

U.S. PATENT DOCUMENTS

| | | | |
|---|---|---|---|
| 2020/0026342 A1 | 1/2020 | Sengupta et al. | |
| 2020/0158556 A1 | 5/2020 | Strutt et al. | |
| 2020/0379538 A1* | 12/2020 | Hefner | G06F 1/1641 |
| 2022/0059210 A1* | 2/2022 | Gurumoorthy | G16H 50/30 |
| 2023/0337981 A1* | 10/2023 | Srinivasan | G06F 1/3215 |
| 2024/0319246 A1* | 9/2024 | Huber | G01R 27/32 |
| 2024/0333578 A1* | 10/2024 | Mehta | G06N 20/20 |

FOREIGN PATENT DOCUMENTS

| | | |
|---|---|---|
| KR | 1020210048941 B1 | 5/2021 |
| NO | 20181651 A1 | 5/2020 |
| NO | 20191252 A1 | 3/2021 |
| WO | WO-2020246897 A1 | 12/2020 |
| WO | WO-2021045628 A1 | 3/2021 |

\* cited by examiner

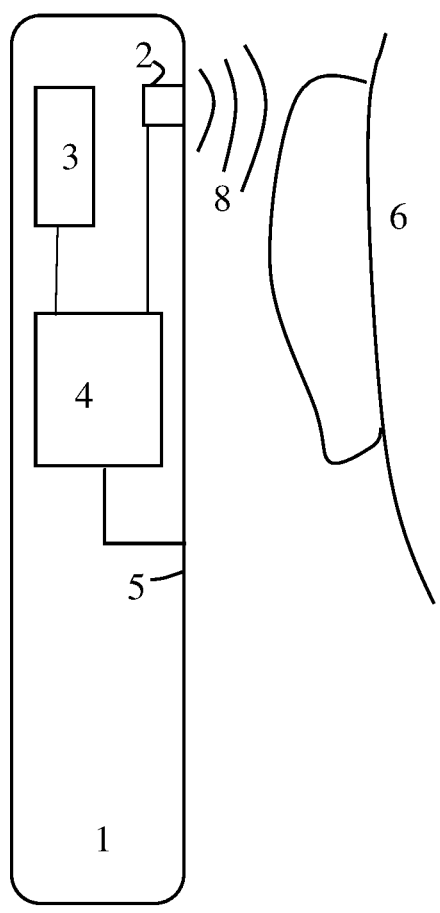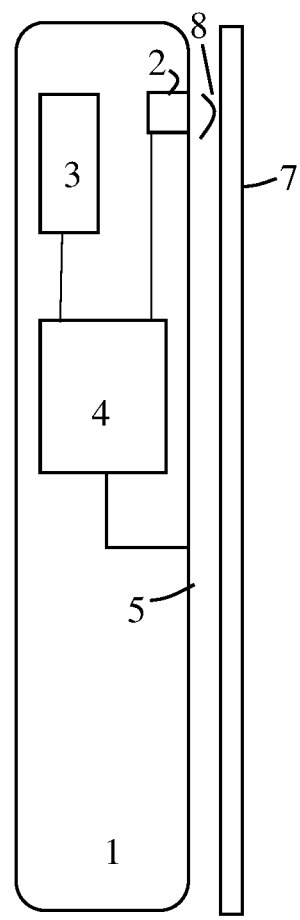
Fig. 1a                     Fig. 1b

ACTIVITY MONITORING FOR ELECTRONIC DEVICE

The present invention relates to an electronic device configured to monitor and control the use of the device.

In electronic devices such as mobile phones and similar devices as discussed in WO2020246897A1, US2020158556, WO20210456628, US2020026342 and US2008/0051165 measurements such as ultrasonic measurements are used to detect proximity, presence and gestures of a user close to the device, e.g. for user input into the system. In electronic devices with screens, ultrasound measurements are also used to detect if an object is close enough to cover at least one of its screens making it impossible for the user to visually interact with the device. If this cover detection functionality is enabled, the device will not turn on the screen unless nothing is covering the screen in question. The cover detection sensor is designed to save power by keeping the screen turned off when it cannot be used anyway. Although the cover detection sensor could report distance to the object covering the screen, it is a usually binary sensor where the possible cover detection states are COVERED and UNCOVERED. While the proximity, presence, gestures or cover detection sensors may use multiple input streams, they are tightly coupled with the ultrasound input stream. However, the measurements require emission and reception sequences which has intermissions between the measurements and limits the amount of information to be detected. Thus, sudden changes such as moving a mobile phone away from the listening position, may not be detected in time. Also, the active measurements are power consuming and thus there is a reason to limit the active periods to a minimum. In US2020158556 the power consumption of the device may be reduced by lowering the power level of the ultrasonic signal, which also reduce the sensitivity and quality of the measurements.

Thus, it is an object of the present invention to provide a solution that limits the power consumption while improving the device performance. This is obtained as defined in the accompanying claims.

According to the present invention a solution is obtained even in cases where at least one of the sensors in the electronic device is not operating. Also, the present invention maintains the quality of the measurements while having a low power consumption during the inactive periods and responsivity during active periods, by using low power units to increase the activity of the power consuming measurement when needed.

In a preferred embodiment both sensor data (e.g. inertial measurement unit (IMU)) and ultrasound data are used both for detecting objects in the proximity of or covering the screen of the device. The detection is tightly coupled to the ultrasound input and output data. With the present invention, the measuring system of the device, will be able to run as long as any or both of the IMU and the ultrasound data streams are running. This means that when the ultrasound stream is not active, the sensor estimates are updated only based on the available IMU data and vice versa. Since the time until receiving the first sensor data from for example an accelerometer sensor is shorter than the time to receive the first audio samples, making use of the accelerometer data while the audio system is being started is beneficial to the performance of the proximity or cover detection sensors. The sensor data could even be continuously stored in memory by a low-power processor where sensor data is gathered from all sensors in the system (e.g. Sensor HUB) and provided to the proximity or cover detection sensor on start to enable the proximity or cover detection sensors to use data pre-dating the start of the sensor.

In another embodiment of using sensor data (e.g. inertial measurement unit (IMU), hinge sensors, etc) and ultrasound data are used in presence detection sensors (e.g. Human Presence Detection) in personal computers (e.g. laptops). These presence detection sensors are used to wake up the laptop when a user approaches and lock the device when the user leaves for security reasons. Combining sensor data with ultrasound input and output data allows the presence detection sensor to use sensor fusion to analyze the current situation and provide improved presence detection and, in some cases, lower the power consumption. One example would be detecting that a user is carrying the device and is obviously close to the device. In this situation, the ultrasound signal may not be needed for the presence detection sensor for as long as the device is being carried thereby creating a discontinuity of the ultrasound input and output signal. Another example would be a system where the hinge sensor can provide the current angle of the laptop screen providing vital sensor fusion information for the presence detection sensor improving the performance for all possible screen angles.

The present invention will be described below with reference to the accompanying drawings, illustrating the invention by way of examples.

FIGS. 1a, 1b illustrates two situations in which the proximity detection may be active.

Figure 2B:
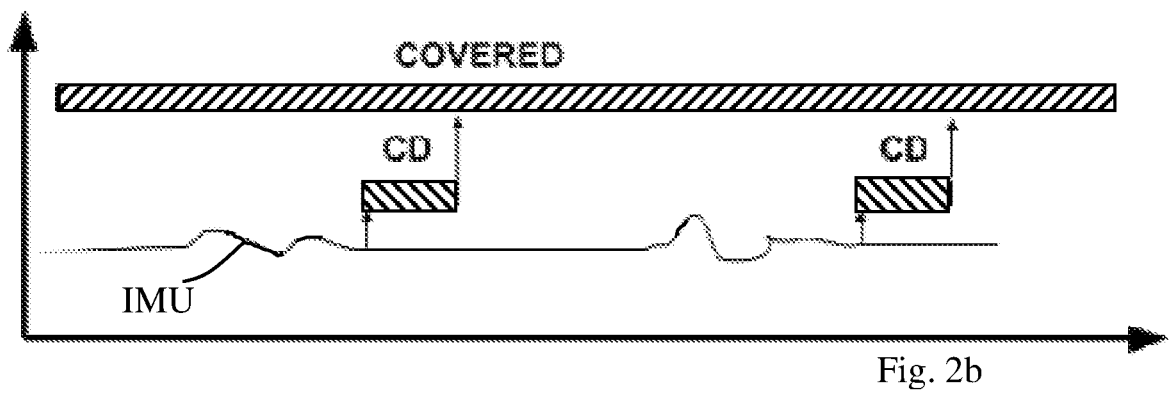

FIGS. 2a-b Illustrates cover detection according to the prior art.

FIGS. 2c-f Illustrates the solution according to the present invention with sensor activity in different situations involving IMU and acoustic sensors.

FIG. 1 illustrates a situation where a mobile phone 1 is in use and held against the ear of the user 6. A processing unit 4 may be connected to a number of sensors, according to the preferred embodiment of the present invention a proximity sensor or cover detection sensor 2 and a movement/IMU sensor 3. The proximity sensor 2 may detect the situation and the processing unit may then shut down certain activities such as some functionalities related to a touch screen 5, preferably using an ultrasound signal 8. At the same time the movement/IMU sensor 3 will register a certain amount of movements. The movements may be analysed by the processing unit 4, e.g. indicating that the device is moved away from the user, e.g. indicating a change in the use even if the proximity sensor 2 is not active which could be an indication that the touch screen 5 or the proximity sensor 2 should be activated.

As mentioned above, devices such as mobile phones may include a number of different sensors, e.g. a light sensor. If the light sensor detects a significant amount of ambient light, possibly compared to recent measurements, while the ultrasound-based proximity or cover detection sensor 2 detects an object covering the screen, the processing unit 4 may decide that the ultrasound sensor 2 is blocked and override the proximity or cover detection signal. Alternatively, the light sensor data may be feed directly into the proximity or cover detection sensors and be included in a detection algorithm in the sensor or in the processing unit which may include machine learning-based sensor fusion as disclosed in abovementioned WO2020246897A1.

Some electronic devices may include foldable screens where at least on screen sensor (e.g. contact sensors, magnetic sensor, hinge sensors, hall sensor etc) detect when the screen is unfolded. The sensor data may include angle information about the foldable screen. If the sensor detects a screen being at least partially unfolded, it could start the ultrasound-based proximity or cover detection sensor 2. If these sensors detect an object covering the screen, the processing unit 4 may decide that the ultrasound sensor 2 is blocked and override the proximity or cover detection signal. Alternatively, the data from at least one screen sensor may be feed directly into the proximity or cover detection sensors together with other types of sensor data (e.g. IMU) and be included in a detection algorithm in the sensor or in the processing unit which may include machine learning-based sensor fusion as disclosed in abovementioned WO2020246897A1.

Other electronic devices include a hardware-based motion sensor that is used to control the operation of the low-power Sensor HUB. Even though the Sensor HUB is a low-power processing element, the Sensor HUB will be turned off for power saving reasons as long as the low-power hardware-based motion sensor indicates that the device is completely still. In this case, the sensor events from for example IMU sensors in the Sensor HUB will not be reported since they sensor values remain the same. Once the hardware-based sensor indicates that the device is not completely still, it will turn on the Sensor HUB, which again will turn on all the sensors that the user or system has requested to be active, e.g. IMU sensors. This scheme is all about reducing power consumption since the hardware-based sensor is using less power than the Sensor HUB processor with for example IMU sensors enabled. Although it is using a chain of sensors to operate, the present invention can make use of the sensor setup described here.

FIG. 1b illustrates a device with Pocket Mode enabled, which is a feature in many modern smartphones using a cover detection sensor to detect that a cover 7 is positioned over the phone surface. It is a feature used in a set of different use-cases. Basically, one or more sensors 2 are used to decide whether for example screens, touch sensitivity or other active units should be at least partially turned off when the smartphone surface is covered, e.g. up-side-down on a table or in a bag or in the user's pocket. The cover detection sensor 2 will usually not run when the device is being used by the user, that is, when the screen is on and the user is visually interacting with the phone. The cover detection sensor 2 is usually a one-off sensor which means that it will auto-disable once the first and only sensor event has been reported. The purpose of this sensor is to prevent the screen from being turned on when the user has no intention of using or visually interacting with the phone and its screen since the screen is covered.

FIGS. 2a and 2b illustrates the prior art, In FIG. 2a the cover detection CD is continuously active and is typically based on IR detection. In this scenario, the cover detection sensor CD is not an one-off sensor but will continuously report changes in cover detection state. One example of a use-case with continuous reporting is an Always-On-Clock displayed on an otherwise turned-off screen. It enables the user to see what time it is without turning the screen completely on thereby reducing overall power consumption. Ideally, the smartphone should only display the clock if the screen is not covered, that is, when the user can see the screen in question.

FIG. 2b illustrates a more advanced system wherein a movement sensor IMU registers a specific activity and then triggers the cover detection. This is repeated every time a movement is registered.

More in detail in FIG. 2b the cover detection sensor will be triggered by the processing unit 5 based on user actions, e.g. detected with the IMU 3, such as lifting the phone to your face (raise-to-wake), touching the screen 5, pushing the power button, etc. Once any of these triggers are detected, the device decides whether any of the smartphone screens are covered by activating the cover detection for short time periods. If not, the appropriate action will be taken, such as turning the screen on or turning on any loging mechanism including biometric login mechanisms. If it is covered, as illustrated in FIG. 2b, the triggering event will be ignored as the screen in question is covered and the system will wait until the next signal from the IMU or detected actions. Some smartphones will turn the screen on for a few seconds to allow different type of user actions (e.g. slide up, button press, etc) to override the detection of something covering the screen. Regardless, when triggered, the cover detection sensor 2 is usually only active for short periods of time (i.e. few seconds).

The power consumption of Pocket Mode use-case that may be based on an ultrasound cover detection sensor or sensor fusion of an ultrasound cover detection sensor and other suitable sensors, may be too high for an always-on scenario given the limited battery capacity of modern smartphones.

According to the present invention the Pocket Mode use-case can be implemented using an acoustic sensor such as an ultrasound cover detection sensor 2 or constitute a fusion sensor as disclosed in WO2020246897A1 wherein the processing unit 4 combines sensor information from an ultrasound cover detection sensor 2 and any number of other sensors including IMU sensors 3 (accelerometer, gyroscope etc), light sensors, etc at least some of which continuously monitoring the interactions with the device and having low power consumption compared to the active ultrasound sensor 2.

According to the present invention, it is an objective to reduce the power consumption or wear and tear of audio components transmitting and receiving ultrasound by triggering the cover detection sensor 2 based on pattern recognition used on signals from a number of sensors etc in the device, probably based on Machine Learning in a fusion sensor running on the low-power Sensor HUB in the processing unit 4, while also using the passive measuring units to monitor and sample the measured use of the device. Processing of the neural network modules embedded in the pattern recognition may be offloaded from the Sensor HUB to an optimized neural network processing core if the power consumption of neural network processing on this core is acceptable from an overall power consumption viewpoint. The machine learning process may be of any available type being using any available tools (e.g. TensorFlow) needs to be capable of sampling and storing information from the different units and sensors in the device, as well as possibly a user interface providing feedback from the user and find typical patterns of use. The data needs to be manually or automatically tagged with ground truth before the training process of the neural network is done either on-device or off-device. The process may also take into account concerns such as limiting energy consumption and satisfying user feedback during training. The machine learning process may also be provided in an external system being capable of updating the device software through firmware updates or similar. These updates can be done explicitly by the user or through an over-the-air solution.

The present invention may use different sensors including IMU sensors, light sensor, motion sensors, etc to model and detect usage patterns for the smartphone, that is, situations where the cover detection state of the screen changes (e.g. pull device out of pocket, raise-to-wake, put device in pocket, put device on table, walking-phone in hand/pocket, etc) enough to warrant an updated cover detection state. Once the Pocket Mode use-case is started, it will request sensor information from the device sensors, possibly including cached information from before the cover detection sensor was activated. All the information including current information will be used to make a decision on the cover detection state. Reducing the sensor event latency is another benefit of only running Pocket Mode use-case whenever pattern recognition suggests a possible change in device pocket mode state. Since the startup time of the audio system is in the order of 50-150 milliseconds in most modern smartphones, the cover detection sensor based on the scheme outlined here could answer immediately (i.e. few milliseconds) without starting the audio system as part of a complete one-off cover detection sensor cycle.

Figure 2C:
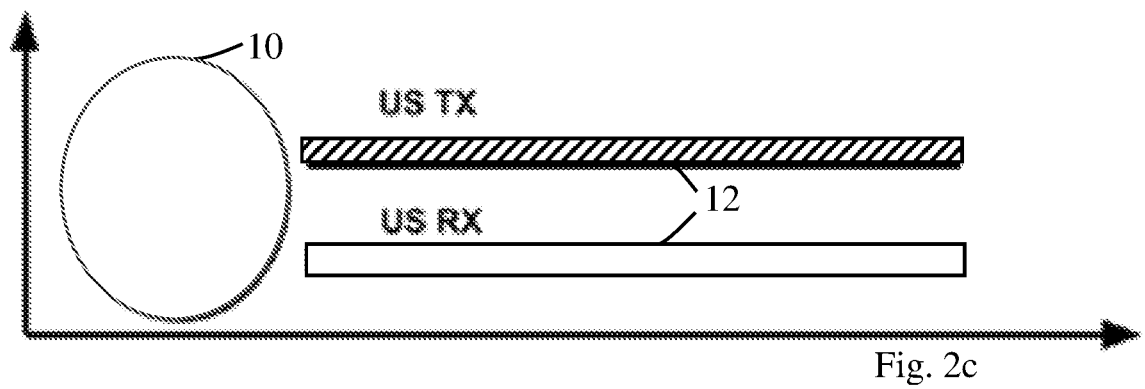

As mentioned above another aspect of the present invention is bridging the Ultrasound Discontinuity. As illustrated in FIG. 2c the ultrasound system signals 12 including transmitters US TX and receivers US RX, may have periods 10 where no actionable information is detected due to unmanageable interference in the frequency band used by the ultrasound system from other ultrasound transmitting devices, or destructive intermodulation due to concurrent audio use-cases, or unmanageable, random gain variations due to speaker protection algorithms altering the ultrasound output signal, or concurrent audio use-cases playing with an high amplitude leaving no headroom for mixing in the ultrasound signal, or latency in the order of 50-250 milliseconds from the sensor is activated by the system until the ultrasound input and output paths are ready for playback and capture of ultrasound. In some cases, the ultrasound sensor may send out a non-continuous ultrasound signal in bursts creating discontinuities in the ultrasound output and ultrasound input signal. Another similar issue that can cause disruption in the ultrasound signal and thereby normal ultrasound processing are changes in the audio system due to use-case changes. Some of the most popular apps in modern smartphones will switch audio input and/or output from one audio device to another based on what the user is doing. Some applications will use different audio components based on whether the user is holding the phone in front of his body or against his ear. The selected audio device may change at any time when the user moves the phone again or explicitly forces the phone to use either speaker mode, headset mode or handset mode.

One some platforms with shared backend digital audio interfaces (DAI), switching audio from one component (e.g. speaker) to another (e.g. earpiece receiver) requires other concurrent audio use-cases such as the ultrasound output signal used by an ultrasound sensor to be stopped and after a short pause in the order of tens to hundreds of milliseconds be restarted when the audio stream is being switched from one audio output device to another. Since the ultrasound sensor requires a stimulus signal to generate echos from objects nearby, the ultrasound processing will either be stopped or suspended and restarted or resumed respectively during this process. As a result, the Ultrasound use-case (e.g. proximity sensor, gesture sensor, presence sensor, cover detection sensor, etc) does not have any relevant information to make decisions when this discontinuity happens.

Activity monitoring (e.g. keyboard usage, touch screen usage, hinge sensor events, etc) could also make it possible for the ultrasound sensor to temporarily suspend operation or merely reduce ultrasound signal output in a power saving effort.

Figure 2D:
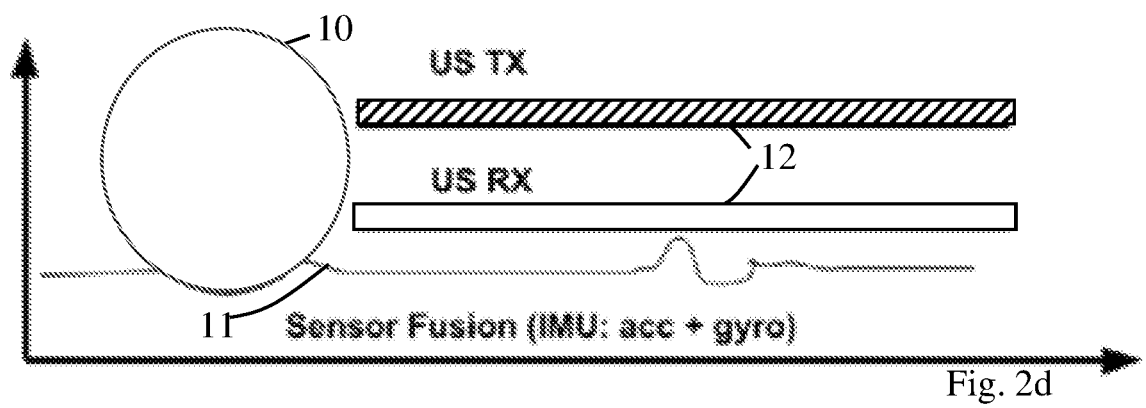

As illustrated in FIG. 2d, using the present invention input 11 from other sensors such as IMU information may be retrieved (e.g. phone not moving, put in pocket, lift to head, remove from head etc) and provide sensor events based on one or more other sensor inputs even while the ultrasound is stopped. Once the ultrasound stream is resumed, the present invention may seamlessly accept data from all the sensors 11 AND the ultrasound signal 12 and use the combined information (e.g. potentially including cached sensor data during the ultrasound discontinuity) to provide accurate sensor events, and through machine learning algorithms implemented as neural networks also recognize and use the pattern of information from different sensors to estimate the use of the device in periods where only part of the sensors are active.

Figure 2E:
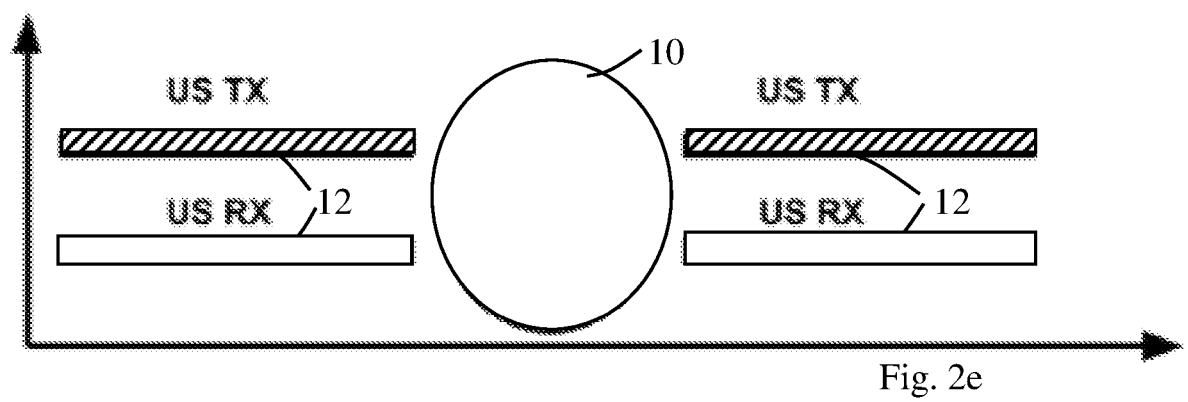
Figure 2F:
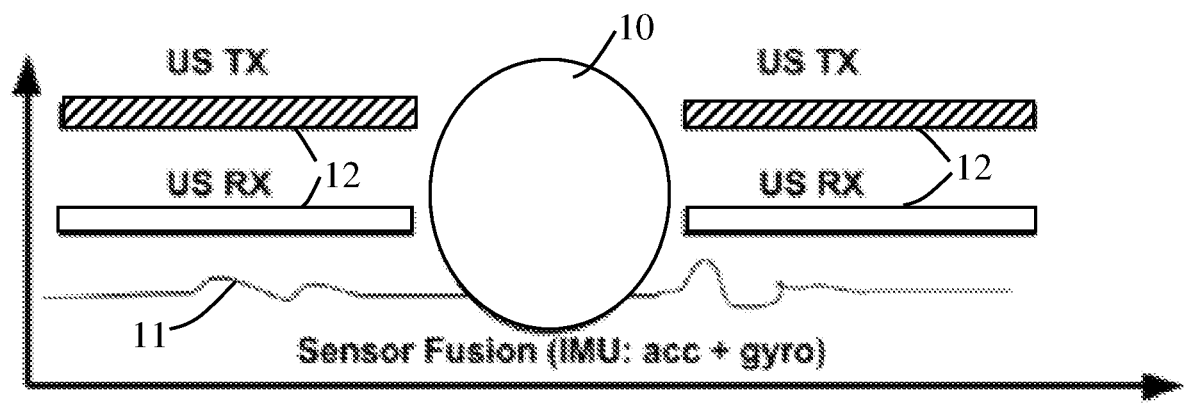

A similar situation is illustrated in FIGS. 2e and 2f where the ultrasound signal 12 is interrupted. In FIG. 2e this leaves the device without ultrasound information for a short period while in 2f additional information allows the device to recognize changes in the use of the device and to adapt to them or to active the ultrasound sensor depending on the registered situation.

The signals from the second measuring units such as IMU 3 may thus include both information about the device activity before and during the activity of the ultrasound sensor, as well as in interruptions or inactivity of the ultrasound sensor providing periods without ultrasound data 10.

To summarize the present invention relates to a method and an electronic device including at least two measuring units. The first measuring unit is an active measuring unit emitting and receiving a signal related to a first chosen parameter in a sequence including at least one active emission period and reception period providing a signal related to the proximity of an object such as a cover of at least part of the device such as a screen. The sequence will thus have inactive periods as well as active periods. The second measuring unit comprises an essentially continuous measurement of a predetermined second parameter, preferably related to the use and activity of the device or the device surroundings such as sound and illumination, and preferably being a passive measurement having a substantially lower power consumption than the first measuring unit.

The device includes a processing unit coupled to said measuring units and is configured to register deviation in the second parameter and at a predetermined deviation alter the sequency of the first measurement, by activating the first measuring unit. The registration of the second parameter may be performed continuously or at a sufficient rate to provide an essentially continuous monitoring of the second parameter, compared to a reasonable expected rate of change in the parameter. The processing unit may constitute a low-power hub for the sensors in order to limit the power consumption of the device and be configured to combine the measurements from all the sensors to provide a continuous representation of the use of the activity of the device.

Preferably the first measurement unit is an ultrasonic measurement unit configured to detect an object in the proximity of the device, e.g. a cover or a user, the ultrasound measurement being performed with any available sensor type being able to detect objects close to or covering the sensor. The ultrasound detection may use specialized transducers or transducers already in the device such as speakers and/or microphones suitable for operating the the near ultrasound range, e.g. 20-24 kHz.

The second measurement unit is preferably an inertial measurement unit (IMU) configured to measure movement of the device, but may also include a light sensor measuring ambient light, a keyboard/mouse, touch-sensitive sensors e.g. at the device screen or a button or switch on the device possibly chosen depending on which available measurement unit has the lowest power consumption. When using a touch pad or screen interactions with the device surface may be measured and patterns of movements may be interpreted.

The processing unit of the device may be configured to activate the first measurement unit when said deviation is above a predetermined limit, such as allowing some minor movements before activating the active sensors. The threshold may be set in the initialization of the device or may be adaptive based on previous measurements and machine learning such as by determining how often the cover detection state is actually changed based when the sensor has been activated. Thus, the deviation may be based on a predefined pattern of measurements, such as measured patterns of movements of the device while being power on, where predefined patterns may be based on previous movements registered as typical for the device through analysis.

The invention claimed is:

1. An electronic device comprising:
   at least two measuring units, wherein a first measuring unit is an active measuring unit emitting and receiving a signal related to a first chosen parameter in a sequence, the sequence having inactive periods;
   wherein the second measuring unit comprises an essentially continuous measurement of a predetermined second parameter, the second measuring unit having a lower power consumption than the first measuring unit;
   wherein the first parameter is related to a proximity measurement configured to measure the proximity of an object in the vicinity of the device and the second parameter is related to a measure of the activity of the device; and
   a processing unit coupled to the at least two measurement units and being configured to register deviation in the second parameter and at a predetermined deviation alter the sequency of the first measurement by activating the first measuring unit.

2. The electronic device according to claim 1, wherein the first measurement unit is an ultrasonic measurement unit configured to detect an object in the proximity of the device.

3. The electronic device according to claim 1, wherein the second measurement unit is an inertial measurement unit or motion sensor configured to measure movement of the device.

4. The electronic device according to claim 1, wherein the second measuring unit is a touch sensitive unit measuring interactions with the device surface.

5. The electronic device according to claim 1, wherein the second measuring unit is a light sensor registering changes in ambient lighting.

6. The electronic device according to claim 1, being configured to activate the first measurement unit when the deviation is above a predetermined limit.

7. The electronic device according to claim 1, wherein the second measuring unit is at least one of a keyboard and a computer mouse connected to the device.

8. The electronic device according to claim 1, wherein the deviation is based on a predefined pattern of measurements.

9. The electronic device according to claim 8, wherein the predefined pattern of measurements is based on previous device movements registered as typical for the device through analysis.

10. The electronic device according to claim 1, wherein the analysis is based on machine learning from previous measurements from the measurement units, the predetermined deviation being processed in a neural network based on the analysis.

11. A method for controlling a device comprising at least two measuring units, wherein a first measuring unit is an active measuring unit emitting and receiving a signal related to a first chosen parameter in a sequence including inactive periods, the measurements being related to a proximity measurement configured to measure the proximity of an object and the second measuring unit comprises an essentially continuous measurement of a predetermined second parameter, the method comprising:
   storing and registering deviations in the second parameter and at a predetermined deviation alter the sequency of the first measurement by activating the first measuring unit.

12. The electronic device according to claim 2, wherein the object in the proximity of the device is selected from the group consisting of a cover and a user.

13. The electronic device according to claim 8, wherein the predefined pattern of measurements comprise measured patterns of device movements while the phone is powered on and both when the user is handling the phone and when the user is not handling the phone.

14. The electronic device according to claim 1, wherein the processing unit is configured to provide a continuous analysis of the use of the electronic device based on the second parameter, and to use the combined information from the first and second measuring unit provide accurate sensor events when both are active.

15. The method according to claim 11, including the step of providing a continuous analysis of the use of the electronic device based on the second parameter, and also including the step of using the combined information from the first and second measuring unit provide accurate sensor events.

* * * * *